United States Patent
Fang et al.

(10) Patent No.: US 10,904,184 B2
(45) Date of Patent: Jan. 26, 2021

(54) SMART MESSAGE DELIVERY BASED ON TRANSACTION PROCESSING STATUS

(71) Applicant: INTERNATIONAL BUSINESS MACHINES CORPORATION, Armonk, NY (US)

(72) Inventors: Yu Fang, Beijing (CN); Guan Jun Liu, Beijing (CN); Jiang Bin Ning, Beijing (CN); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/654,304

(22) Filed: Oct. 16, 2019

(65) Prior Publication Data
US 2020/0053036 A1    Feb. 13, 2020

Related U.S. Application Data

(63) Continuation of application No. 16/284,260, filed on Feb. 25, 2019, now Pat. No. 10,659,410, which is a continuation of application No. 15/064,147, filed on Mar. 8, 2016, now Pat. No. 10,218,656.

(51) Int. Cl.
*H04L 29/08* (2006.01)
*H04L 12/58* (2006.01)
*G06F 21/55* (2013.01)

(52) U.S. Cl.
CPC .......... *H04L 51/12* (2013.01); *G06F 21/554* (2013.01); *H04L 51/02* (2013.01); *H04L 67/2842* (2013.01)

(58) Field of Classification Search
None
See application file for complete search history.

(56) References Cited

U.S. PATENT DOCUMENTS

| 7,712,136 B2 | 5/2010 | Sprosts |
| 8,131,868 B2 | 3/2012 | Foygel |
| 8,347,292 B2 | 1/2013 | Beckerle |

(Continued)

OTHER PUBLICATIONS

IBM: List of IBM Patents or Patent Applications Treated As Related (Appendix P), Nov. 11, 2019, pp. 1-2.

(Continued)

*Primary Examiner* — Natisha D Cox
(74) *Attorney, Agent, or Firm* — Robert C. Bunker (57) ABSTRACT

A method for message delivery to a transaction processor is presented. The method may include receiving a message having transaction information. The method may also include determining if the received message is prohibited from delivery based on comparing the transaction information with a blacklist, wherein the blacklist is used to block messages. In response to determining that received message is prohibited from delivery, the method may then include refusing message delivery or delaying message delivery. In response to determining that the received message is not prohibited from delivery, the method may further include enqueuing the message in a request queue. The method may also include receiving a reply message with a transaction status update from the transaction processor. The method may then include updating the blacklist based on the received reply message with the transaction status update.

15 Claims, 7 Drawing Sheets

(56) References Cited

U.S. PATENT DOCUMENTS

| | | | |
|---|---|---|---|
| 8,667,505 | B2 | 3/2014 | Woods |
| 8,745,143 | B2 | 6/2014 | Vitaldevara |
| 8,868,776 | B2 | 10/2014 | Foygel |
| 9,509,641 | B1* | 11/2016 | Li .......................... H04L 45/60 |
| 10,218,656 | B2 | 2/2019 | Fang |
| 2007/0027992 | A1 | 2/2007 | Judge |
| 2008/0298235 | A1* | 12/2008 | Neugebauer ........ H04L 43/0864 370/232 |
| 2009/0103524 | A1 | 4/2009 | Mantripragada, Sr. |
| 2011/0289162 | A1 | 11/2011 | Furlong |
| 2013/0097660 | A1 | 4/2013 | Das |
| 2013/0097708 | A1 | 4/2013 | Jayanthi, Sr. |
| 2015/0134747 | A1 | 5/2015 | Dixon |
| 2015/0271256 | A1 | 9/2015 | Pathak |
| 2016/0088011 | A1 | 3/2016 | Johri |
| 2017/0264579 | A1 | 9/2017 | Fang |
| 2017/0295231 | A1 | 10/2017 | Clemm |
| 2018/0075530 | A1* | 3/2018 | Kavanagh ........... G06F 12/0646 |
| 2019/0190867 | A1 | 6/2019 | Fang |

OTHER PUBLICATIONS

Apache, "Producer Flow Control," Apache ActiveMQ™, p. 1-4, The Apache Software Foundation, http://activemq.apache.org/producer-flow-control.html, Accessed on Jan. 13, 2016.

IBM, "FIFO functionality deadlocks when any ActiveMQ queue reaches flow control capacity," IBM Support Document, Last Modified on Oct. 30, 2011, p. 1-2, http://www-01.ibm.com/support/docview.wss?uid=swg21551722, Accessed on Jan. 18, 2016.

IBM, "Why upgrade to IBM MQ V8?," IBM Software Data Sheet, Jun. 2014, p. 1-5, IBM Corporation.

Mell et al., "The NIST Definition of Cloud Computing," National Institute of Standards and Technology, Sep. 2011, p. 1-3, Special Publication 800-145.

Microsoft, "Message Throttling," Exchange 2013 Help, Last Modified on Mar. 9, 2015, p. 1-5, https://technet.microsoft.com/en-in/library/bb232205, Accessed on Jan. 18, 2016.

* cited by examiner

SMART MESSAGE DELIVERY BASED ON TRANSACTION PROCESSING STATUS

BACKGROUND

The present invention relates generally to the field of computing, and more particularly to electronic message processing.

Transaction processing systems are widely used to support businesses around the world, such as banking, airlines, insurance, securities, etc. Message oriented middleware (MOM) provides a reliable transport backbone that enables programs to communicate with one another across a network to transport data as messages.

SUMMARY

According to one exemplary embodiment, a method for message delivery to a transaction processor is provided. The method may include receiving a message having transaction information. The method may also include determining if the received message is prohibited from delivery based on comparing the transaction information with a blacklist, wherein the blacklist is used to block messages. In response to determining that received message is prohibited from delivery, the method may then include refusing message delivery or delaying message delivery. In response to determining that the received message is not prohibited from delivery, the method may further include enqueuing the message in a request queue. The method may also include receiving a reply message with a transaction status update from the transaction processor. The method may then include updating the blacklist based on the received reply message with the transaction status update.

According to another exemplary embodiment, a computer system for message delivery to a transaction processor is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a message having transaction information. The method may also include determining if the received message is prohibited from delivery based on comparing the transaction information with a blacklist, wherein the blacklist is used to block messages. In response to determining that received message is prohibited from delivery, the method may then include refusing message delivery or delaying message delivery. In response to determining that the received message is not prohibited from delivery, the method may further include enqueuing the message in a request queue. The method may also include receiving a reply message with a transaction status update from the transaction processor. The method may then include updating the blacklist based on the received reply message with the transaction status update.

According to yet another exemplary embodiment, a computer program product for message delivery to a transaction processor is provided. The computer program product may include one or more computer-readable storage devices and program instructions stored on at least one of the one or more tangible storage devices, the program instructions executable by a processor. The computer program product may include program instructions to receive a message having transaction information. The computer program product may also include program instructions to determining if the received message is prohibited from delivery based on comparing the transaction information with a blacklist, wherein the blacklist is used to block messages. In response to determining that received message is prohibited from delivery, the computer program product may then include program instructions to refuse message delivery or delay message delivery. In response to determining that the received message is not prohibited from delivery, the computer program product may further include program instructions to enqueue the message in a request queue. The computer program product may also include program instructions to receive a reply message with a transaction status update from the transaction processor. The computer program product may then include program instructions to update the blacklist based on the received reply message with the transaction status update.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for message transaction processing. As such, the present embodiment has the capacity to improve the technical field of electronic message processing by providing message oriented middleware (MOM) with a way to utilize data from transaction processing to estimate possible delivery failure or errors due to transaction processing failures such that the MOM can refuse a transaction request in advance. More specifically, a smart message delivery mechanism based on processing knowledge may include transaction processing status information embedded into an existing message structure. The MOM may be augmented with a transaction status monitor that may process incoming messages asynchronously from typical message processing. The transaction status monitor may determine that messages from certain users are blocked and refuse message delivery. Furthermore messages in queue for delivery may be processed by the transaction status monitor to identify and return messages with an estimated time of delivery exceeding the expiration time associated with the message.

As described above previously, transaction processing systems are widely used to support businesses around the world, such as banking, airlines, insurance, securities, etc. Message oriented middleware (MOM) provides a reliable transport backbone that enables programs to communicate with one another across a network to transport data as messages. Transaction processing and MOM may be widely used in enterprise systems and capable of both online transaction processing and batch processing. In many business environments, a high priority is placed on high throughput and short response times for each transaction which may demand as much available system resources as possible.

In a typical transaction, a frontend application may send a request to the MOM. The MOM may then relay the message to the transaction processor. The transaction processor may get the message indicating a request and schedule tasks for processing the request (e.g., may update a database or file) and send a reply message to the MOM. Finally, the frontend application may then receive a reply message as a result of the processed request from the MOM. Messages are asynchronous by nature and often may be used in a pseudo-synchronous fashion for request and reply scenarios.

The MOM may attempt to deliver messages as soon as the MOM can subject to basic delivery considerations. Delivery considerations within a typical MOM include a first in first out (FIFO) delivery model with priority ordering (e.g., messages with high priority are delivered first). Furthermore, in some situations, a message may not be delivered in time due to availability (e.g., service outage, destination error, target full, network error, etc.) and capacity (e.g., reached maximum processing capacity) issues. The typical MOM model may allow messages to accumulate in the queue wasting storage space and increasing delivery times. Additionally, request messages may expire, thus wasting system resources used to resend the request message. The transaction processor may be prevented from processing a transaction when a transaction is blocked after reaching the transaction processor due to lack of available resources or when a transaction user is revoked (i.e., blocked) in the transaction processor. In both scenarios, the request message has used system resources in the course of being delivered from the frontend application to the transaction processor and for the transaction processor to determine that the request message may not be processed.

Therefore, it may be advantageous to, among other things, provide a message delivery system that asynchronously determines possible transaction processor issues that would interfere with deliver before delivering a request message to the transaction processor.

According to at least one embodiment, upon receiving a new message, the MOM may determine if the transaction or user associated with the received message is prohibited from using the transaction processor. The user or transaction may be determined as prohibited based on searching a blacklist of users/transactions. Whereupon it is determined that the transaction or user associated with the message is prohibited, an error may be generated and the message may be blocked and delivery to the transaction processor refused.

According to at least one embodiment, existing messages in the message queue may also be analyzed before delivery to the transaction processor. An estimated time to deliver the message to the transaction processor may be determined and the estimated time to deliver may be compared with a message expiration time. If the message will expire before the estimated time to deliver, the message may be discarded. However, if the estimated time to delivery may happen before the message will expire, the message may wait in the message queue for the transaction processor to take delivery.

Therefore, the above request messages may not waste resources by being in a queue and delivered to the transaction processor when the user/transaction are prohibited or when the estimated time to delivery exceeds the message expiration time.

Figure 1:
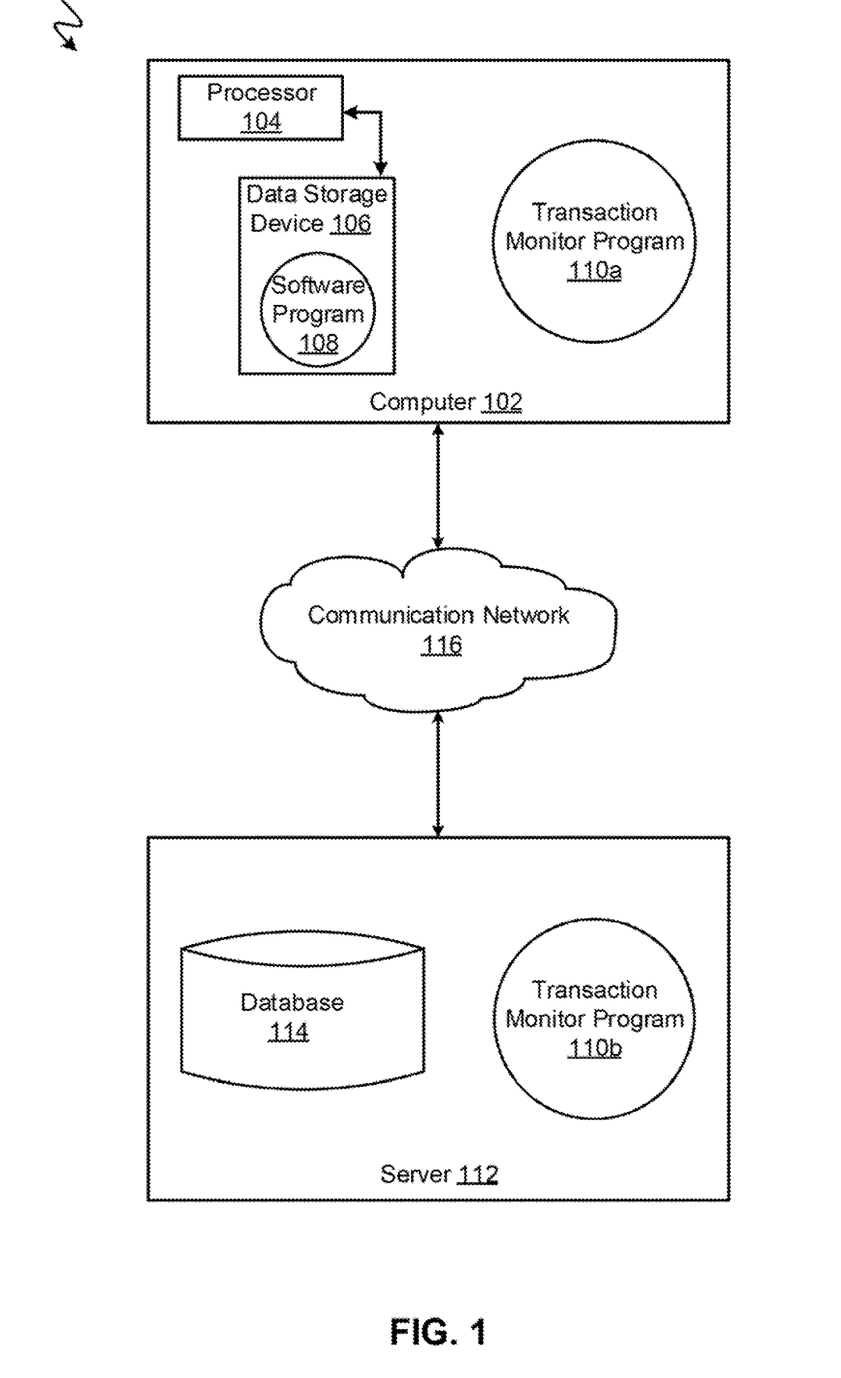
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a transaction monitor program 110a. The networked computer environment 100 may also include a server 112 that is enabled to run a transaction monitor program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the transaction monitor program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the transaction monitor program 110a, 110b (respectively) to prevent messages from being delivered to a transaction processor based on a blocked user/transaction or due to lack of transaction processor resources. The transaction monitor program 110a and 110b is explained in more detail below with respect to FIGS. 2, 3, and 4.

Figure 2:
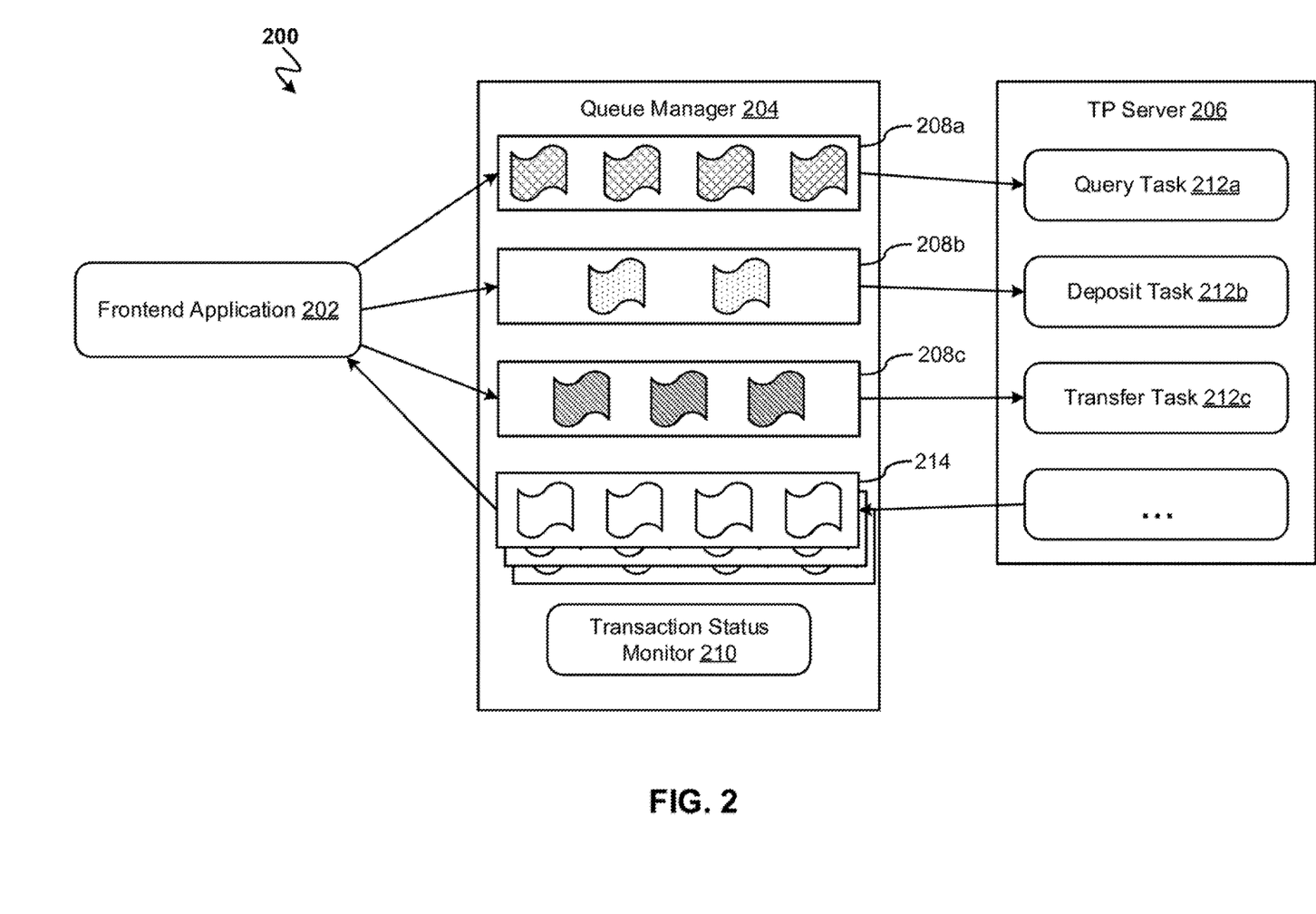
FIG. 2 is a system flow diagram of a message delivery system according to at least one embodiment.

Referring now to FIG. 2, a system flow diagram of a message delivery system 200 according to at least one embodiment is depicted. The message delivery system 200 includes a frontend application 202, a queue manager 204, and a transaction processing (TP) server 206.

According to at least one embodiment, the frontend application 202 (e.g., an order processing application) may generate a request message and send the generated request message to message oriented middleware (MOM) associated with the queue manager 204. Thereafter, the queue manager 204 may place the received request message into a request queue 208a-c based on the type of request (e.g., query, deposit, transfer, etc.). As new messages are received by the queue manager 204, a transaction status monitor 210 may analyze the received message for blocked users or transactions, whereupon determining that the received message is associated with a blocked user or transaction, the transaction status monitor 210 may refuse or delay delivery of the message as will be described below in further detail with regard to FIG. 3. Messages placed in request queues 208a-c may also be analyzed to determine if the message will be processed before the message is set to expire and the transaction status monitor 210 may discard the message if the message may expire before the TP server 206 may process the message as will be described in further detail below with respect to FIG. 4. As such, analysis by the transaction status monitor 210 may be performed separately from standard message management done by the queue manager 204, thus queue manager 204 response times may not be increased. The queue 208a-c that the queue manager 204 placed the message into, may contain the message until the TP server 206 is available to process the request message.

Once the TP server 206 is ready to receive the request message, the queue manager 204 may forward the request to the TP server 206 and the TP server 206 may perform the task 212a-c based on the type of request. After processing the task 212a-c, the TP server 206 may send a reply message back to the queue manager 204. The queue manager 204 may then place the reply message into a reply queue 214. Finally, the queue manager 204 may forward the reply message back to the frontend application 202.

For example, an order processing application (i.e., frontend application 202) may generate a query request message in response to user input. The generated query message may be transmitted from the frontend application 202 to a queue manager 204 via a network connection (e.g., communication network 116 (FIG. 1)). Thereafter, the transaction status monitor 210 may analyze the received query request message to determine if the user or transaction is blocked, as will be described in further detail below with respect to FIG. 3. If the transaction status monitor 210 determined that the message is associated with a blocked user or transaction, an error may be generated and the message may not be placed on a request queue 208a-c. However, if the received query request message is not associated with a blocked user or transaction, the received query request message will be placed on the query request queue 208a by the queue manager 204 since the message is for a query request. Then, the transaction status monitor 210 may analyze the received query request message in the query request queue 208a to determine if the TP server 206 will be able to perform a query task 212a before the received query request message is set to expire as will be described in further detail below with respect to FIG. 4. If the transaction status monitor 210 determines that the query request may not be performed before the TP server 206 can process the query task 212a, the transaction status monitor 210 may discard the message (i.e., remove the message from the query request queue 208a) and notify the frontend application 202. However, if the transaction status monitor 210 determines that the message may be processed before expiring, the message may remain in the query request queue 208a until the TP server 206 is ready to process the query request message.

Once any previous query request messages in the query request queue 208a have been removed from the query request queue 208a (i.e., sent to the TP server 206 for processing), the received query request message may be sent from the query request queue 208a by the queue manager 204 to the TP server 206 for processing as a query task 212a. Thereafter, the TP server 206 may generate a reply message in response to performing the query task 212a and the generated reply message may be transferred from the TP server 206 to the queue manager 204 where the reply message may be placed into a reply queue 214. Within the generated reply message, the TP server 206 may include transaction status information that the transaction status monitor 210 may use when analyzing enqueued messages as will be described in further detail below with respect to FIGS. 3 and 4. The queue manager 204 may then transfer the reply message to the frontend application 202 once the reply message reaches the head of the reply queue 214.

Figure 3:
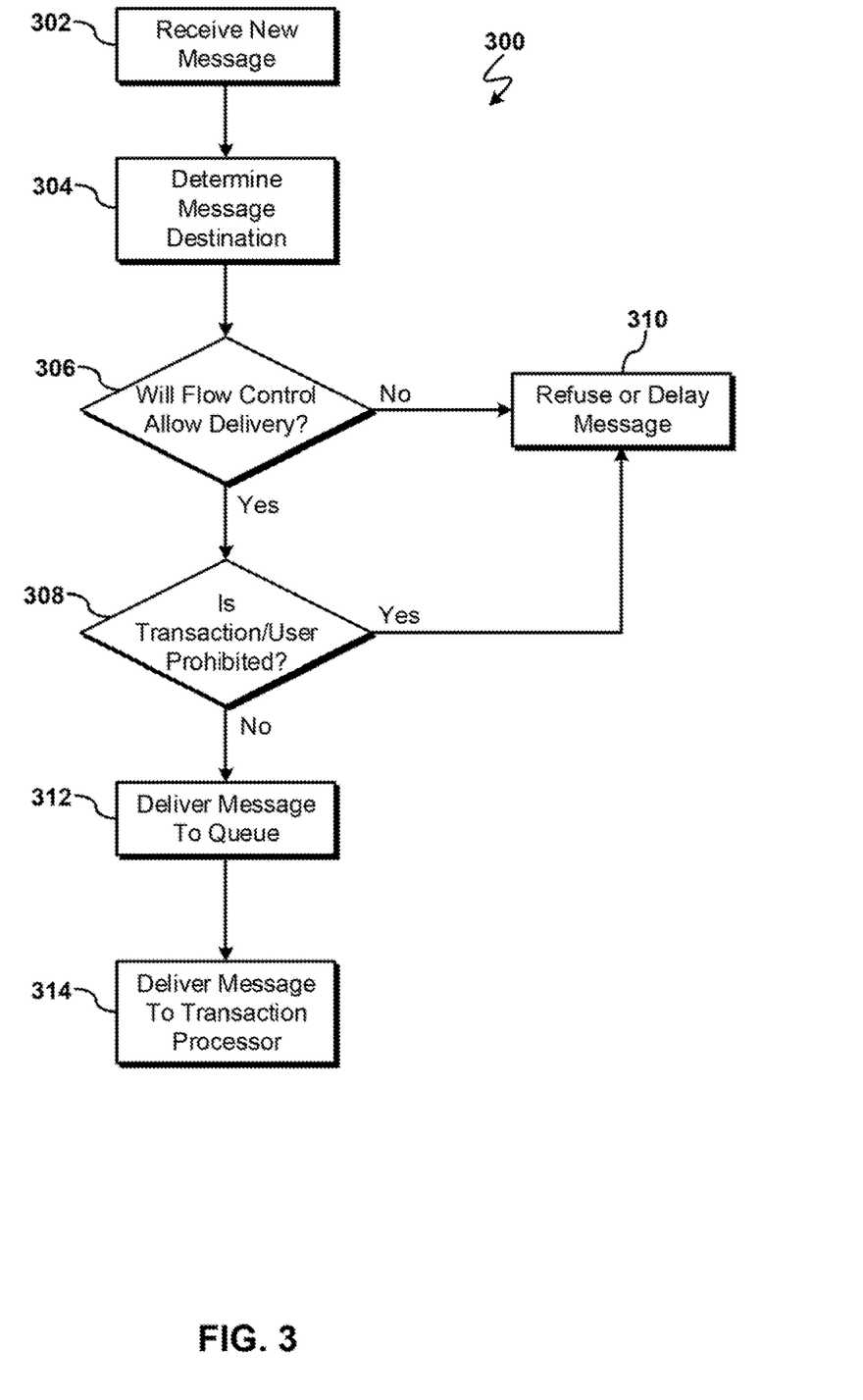
FIG. 3 is an operational flow chart illustrating a process for new message handling according to at least one embodiment.

Referring now to FIG. 3, an operational flow chart illustrating an exemplary new message handling process 300 used by the transaction monitor program 110a and 110b (FIG. 1) according to at least one embodiment is depicted.

At 302 a request message is received. According to at least one embodiment, the frontend application 202 (FIG. 2) may send out a request message requesting a transaction, such as a query, to the queue manager 204 (FIG. 2). Once the new message is received by the queue manager 204 (FIG. 2), the transaction status monitor 210 (FIG. 2) may analyze the received message.

Next, at 304, the message destination is determined. According to at least one embodiment, the message may include a header (i.e., message descriptor) which includes a destination (e.g., TP server 206 (FIG. 2)) or information sufficient to derive the destination.

Then, at 306, it is determined if existing flow control will allow message delivery. According to at least one embodiment, known flow control schemes may be used to determine, for example, the memory limit (or file store limits) for the destination that was determined previously at 304.

If it is determined that existing flow control will allow delivery at 306, then it is determined if the transaction or user associated with the message is prohibited at 308. According to at least one embodiment, the queue manager 204 (FIG. 2) may maintain a data structure, such as a database 114 (FIG. 1), containing a list of transactions that are allowed (i.e., transaction whitelist) and/or a list of transactions that are not allowed (i.e., transaction blacklist) access to transaction processing. Similarly, the queue manager 204 (FIG. 2) may maintain a data structure, such as a database 114 (FIG. 1), containing a list of users that are allowed (i.e., user whitelist) and/or a list of users that are not allowed (i.e., user blacklist) access to transaction processing. The user and/or transaction type (i.e., transaction information) associated with the received message may then be compared with the lists of allowed or prohibited users/transactions.

Additionally, when reply messages are sent after messages are processed by the TP server 206 (FIG. 2), the reply messages may contain transaction status update data that identifies users and transaction types with a flag (e.g., type(bit), value [0-block, 1-allow]) or other indicator identifying if the user and/or transaction is allowed or not allowed. The transaction status monitor 210 (FIG. 2) may then parse the reply message for the transaction status update data and update the whitelists and blacklists accordingly. For example, a reply message sent after a query request may be amended to include transaction status update data in addition to the query request result. As such, the message may contain information indicating that deposit transactions are now allowed. Thereafter, the transaction status monitor 210 (FIG. 2) may detect the transaction status update data in the reply message and update the transaction blacklist to remove deposit transactions, and may also update the transaction whitelist to include deposit transactions.

However, it is determined that existing flow control will not allow delivery at 306 or if it is determined that the transaction or user is prohibited at 308, then the message is refused or message delivery is delayed at 310. According to at least one embodiment, if the user or transaction was found on the list of prohibited users or transactions, the received message may be refused or delayed. For example, if a request message is received for a deposit transaction and the transaction blacklist includes deposit transactions, the received message may be refused.

If it is determined that the transaction and user is not prohibited at 308, then the message may be delivered to a message queue at 312. According to at least one embodiment, if the user and transaction are not found on the user or transaction blacklist and/or if the user or transaction are found on the user or transaction whitelist at 308, then the message may be allowed to proceed to an appropriate request queue 208a-c (FIG. 2). The queue manager 204 (FIG. 2) may determine which request queue 208a-c (FIG. 2) to place the message. For example, if a query request message is received that is associated with User1, it may be determined that User1 is in the user whitelist and thus the queue manager 204 (FIG. 2) may place the query request message into the query request queue 208a (FIG. 2).

Next, at 314, the message will be delivered to the transaction processor (i.e., TP server 206 (FIG. 2)). According to at least one embodiment, default queue manager 204 (FIG. 2) behavior may be used to manage the request queue 208a-c (FIG. 2) that the message was placed in and eventually transmit the request to the TP server 206 (FIG. 2). While the message is in a request queue 208a-c (FIG. 2), the message may also be further analyzed as will be described below with respect to FIG. 4.

Figure 4:
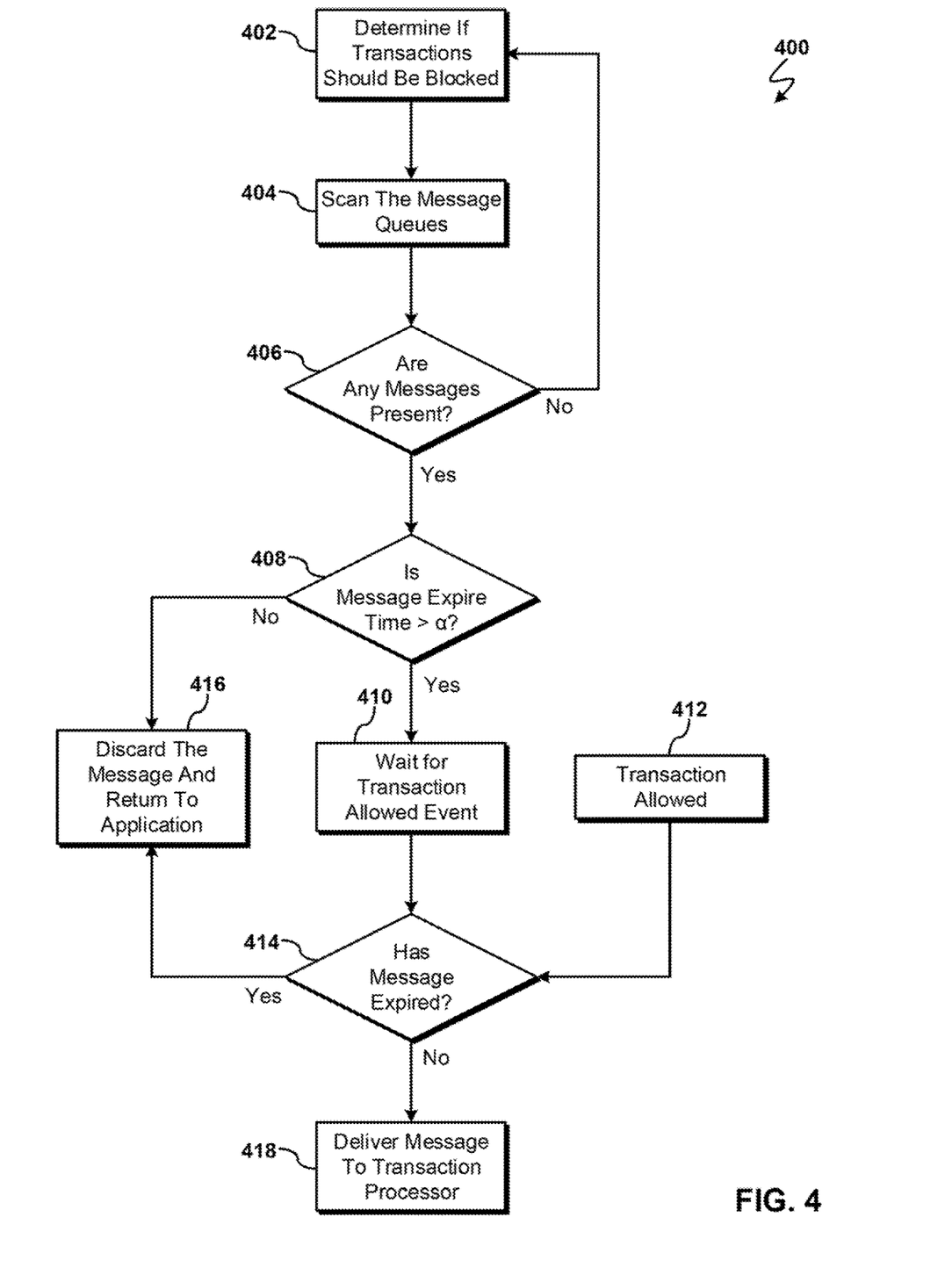
FIG. 4 is an operational flow chart illustrating a process for existing message handling according to at least one embodiment.

Referring now to FIG. 4, an operational flow chart illustrating an exemplary existing message handling process 400 used by the transaction monitor program 110a and 110b (FIG. 1) according to at least one embodiment is depicted.

At 402, it is determined if transactions should be blocked. According to at least one embodiment, the TP server 206 (FIG. 2) may notify the queue manager 204 (FIG. 2) that transactions should be blocked. For example, the TP server 206 (FIG. 2) may be fully saturated and notify the queue manager 204 (FIG. 2) that transactions should be blocked.

At 404, the message queues are scanned. According to at least one embodiment, the request queues 208a-c (FIG. 2) may be scanned or queried to determine if there are any messages present in the request queue(s) 208a-c (FIG. 2).

Next, at 406, it is determined if there are any messages present in the queues. According to at least one embodiment, the result of the message queue scan at 404 may be used to determine if any messages are present in the queue(s). For example, if request queues 208a-c (FIG. 2) are queried (as explained previously at 404), and the returned result indicates that request queue 208c (FIG. 2) has three messages, then it will be determined that messages are present.

If it is determined at 406 that there are messages present in the queue(s), then it is determined if the message's message expire time is greater than a constant $\alpha$ at 408. According to at least one embodiment, the constant $\alpha$ may be set to represent the estimated time that may elapse before a message may be delivered to the TP server 206 (FIG. 2) for transaction processing. The constant $\alpha$ may be determined based on known estimation methods, such as measuring the time other messages are enqueued compared to when the other messages are dequeued, comparing the incoming message load with the TP server's 206 (FIG. 2) throughput capability, etc. A message expire time value associated with the message may indicate how much time may elapse before the message may be processed. The message expire time value may be set to ensure a certain quality of service level or based on other considerations. The message expire time value may be compared with the constant $\alpha$ to determine if the message will be sent to the TP server 206 (FIG. 2) before the message is set to expire.

If it is determined at 408 that the message expire time value exceeds the constant $\alpha$, then the message may remain in a request queue 208a-c (FIG. 2) until a transaction allowed event indicates that the message may be sent to the TP server 206 (FIG. 2) at 410. According to at least one embodiment, the transaction allowed event may be generated by the TP server 206 (FIG. 2) and sent to the queue manager 204 (FIG. 2) when the TP server 206 (FIG. 2) has resources for processing messages. For example, if the message expire time associated with a message in query request queue 208a (FIG. 2) is 15 seconds and the constant $\alpha$ is set to 10 seconds, the message will remain and wait in query request queue 208a (FIG. 2) for a transaction allowed event to occur.

At 412, if transactions are being allowed by the TP server 206 (FIG. 2), messages will follow default queue manager 204 (FIG. 2) behavior. For example, if the TP server 206 (FIG. 2) is not operating at full capacity, request messages (i.e., transactions) may be allowed to be delivered to the TP server 206 (FIG. 2) immediately if the message has not expired.

If a transaction allowed event occurs at 410, or if the transaction is allowed at 412, then it is determined if the message has expired at 414. According to at least one embodiment, a message may expire if the time elapsed since the message was received exceeds the message expire time value associated with the message.

If it is determined at 414 that the message has expired, or if it was determined at 408 that the message expire time is greater than the constant $\alpha$, then the message is discarded and returned to the frontend application 202 (FIG. 2) at 416. According to at least one embodiment, the message may be removed from the request queue 208a-c (FIG. 2) and returned to the frontend application 202 (FIG. 2) or some other notification may generated and sent to the frontend application 202 (FIG. 2) indicating that the message will not be delivered.

However, if it is determined that the message has not expired at 414, then the message is delivered to the transaction processor (e.g., TP server 206 (FIG. 2)) for processing at 418. According to at least one embodiment, the TP server 206 (FIG. 2) may process the task requested in the message and send a reply message containing the results of the task embedded with transaction status information (e.g., blocked or allowed transactions/users, etc.) as described previously. The TP server 206 (FIG. 2) may determine that certain transactions or users should be blocked from using the TP server 206 (FIG. 2) based on resource allocation, user/administrator settings, etc.

It may be appreciated that FIGS. 2, 3 and 4 provide only an illustration of one embodiment and do not imply any limitations with regard to how different embodiments may be implemented. Many modifications to the depicted embodiment(s) may be made based on design and implementation requirements.

Figure 5:
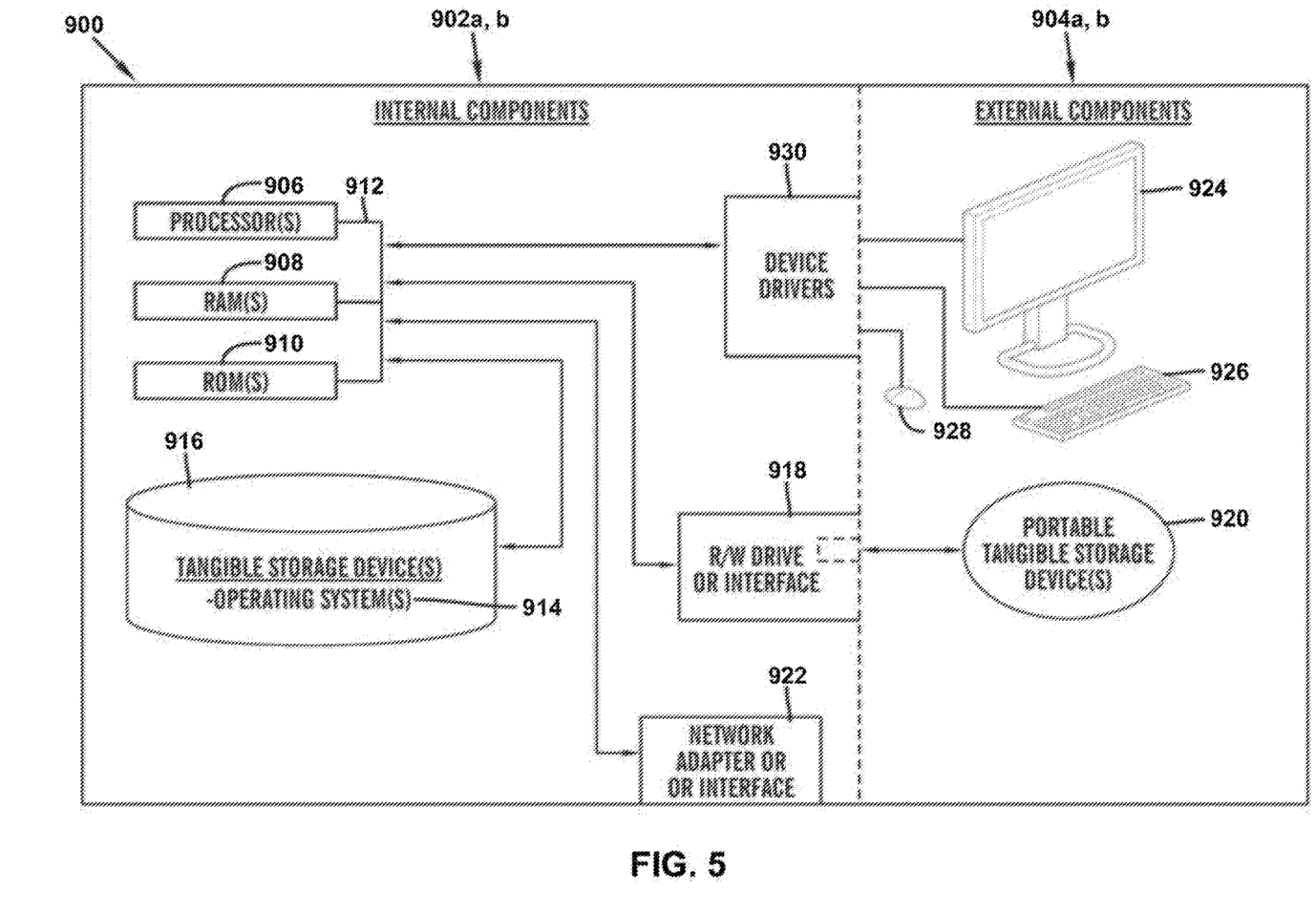
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902a, b and external components 904a, b illustrated in FIG. 5. Each of the sets of internal components 902a,b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the transaction monitor program 110a (FIG. 1) in client computer 102 (FIG. 1) and the transaction monitor program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the transaction monitor program 110a and 110b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 (FIG. 1) and the transaction monitor program 110a (FIG. 1) in client computer 102 (FIG. 1) and the transaction monitor program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the transaction monitor program 110a (FIG. 1) in client computer 102 (FIG. 1) and the transaction monitor program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
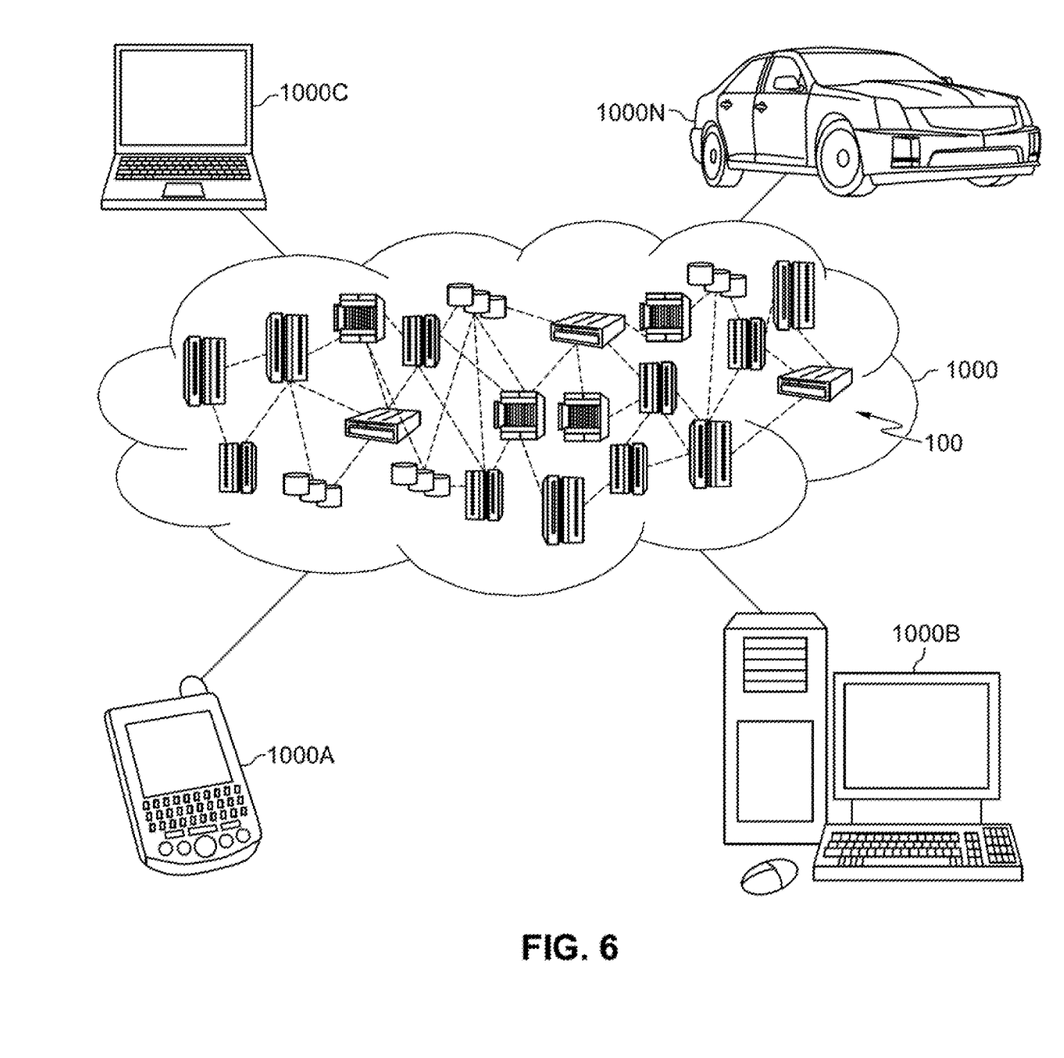
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
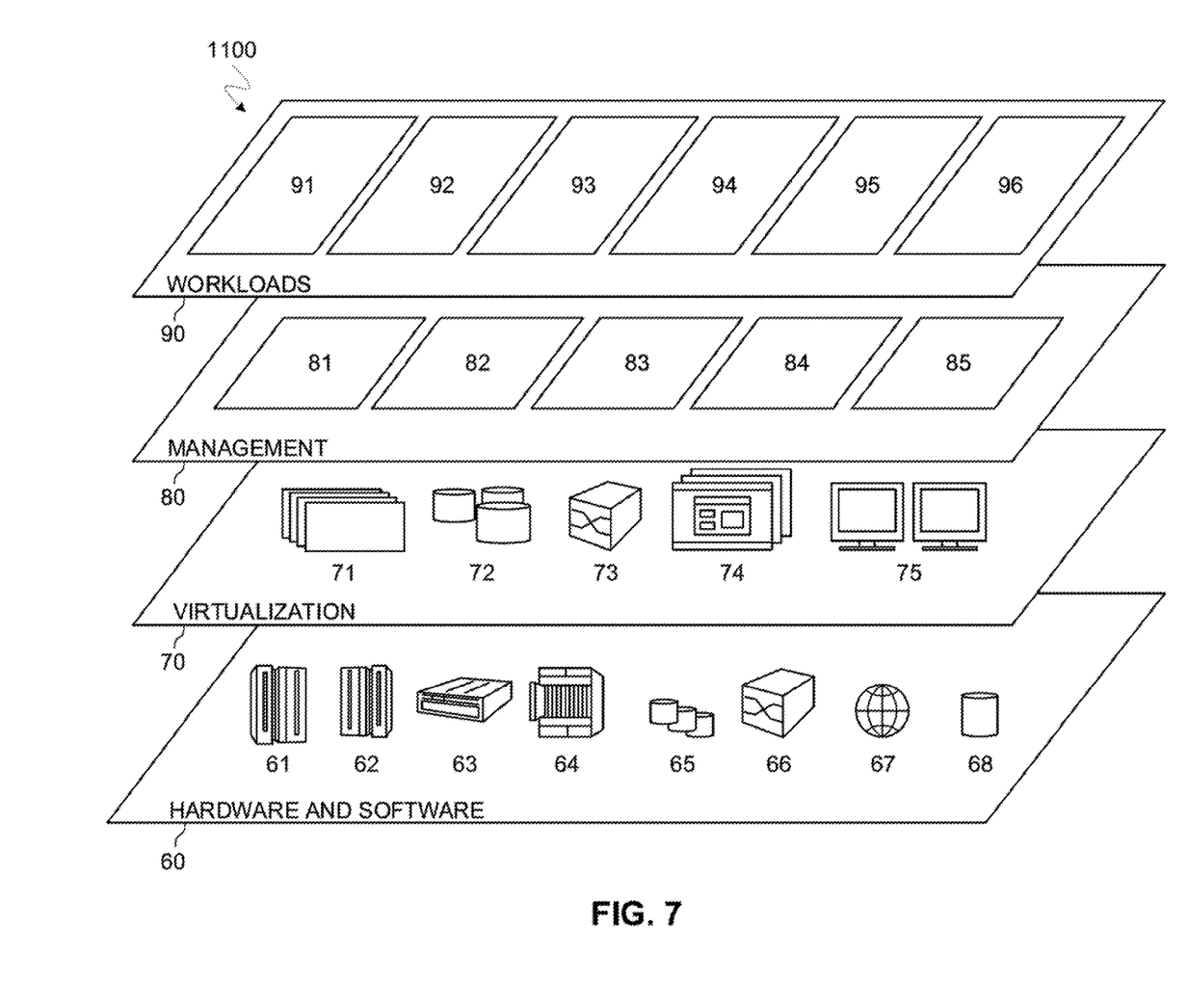
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and queue manager 96. A transaction monitor program 110a, 110b (FIG. 1) provides a way to prevent messages from being delivered to a transaction processor based on a blocked user/transaction or due to lack of transaction processor resources to handle the message before the message expires.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for message delivery to a transaction processor, the method comprising:
   detecting an enqueued message in the request queue;
   in response to detecting the enqueued message in the request queue, determining if an expire time associated with the detected message exceeds an estimated delivery time;
   in response to determining that the expire time associated with the detected message does not exceed the estimated delivery time, discarding the detected message from the request queue;
   in response to determining that the expire time associated with the detected message exceeds the estimated delivery time, waiting until a transaction allowed event occurs;
   in response to the transaction allowed event occurring, determining if the detected message has not expired; and
   in response to determining that the detected message has not expired, sending the detected message to the transaction processor.

2. The method of claim 1, further comprising:
   determining that the enqueued message is not prohibited from delivery based on comparing transaction information associated with the enqueued message with a whitelist, and wherein the whitelist is used to indicate the transaction processor can handle the enqueued message.

3. The method of claim 2, wherein the transaction information includes at least one of a transaction type, and a user.

4. The method of claim 2, wherein the whitelist comprises at least one of a list of allowed transaction types, and a list of allowed users.

5. The method of claim 4, further comprising:
   updating the whitelist based on a reply message with a transaction status update.

6. A computer system for message delivery to a transaction processor, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   detecting an enqueued message in the request queue;
   in response to detecting the enqueued message in the request queue, determining if an expire time associated with the detected message exceeds an estimated delivery time;
   in response to determining that the expire time associated with the detected message does not exceed the estimated delivery time, discarding the detected message from the request queue;
   in response to determining that the expire time associated with the detected message exceeds the estimated delivery time, waiting until a transaction allowed event occurs;
   in response to the transaction allowed event occurring, determining if the detected message has not expired; and
   in response to determining that the detected message has not expired, sending the detected message to the transaction processor.

7. The computer system of claim 6, further comprising:
   determining that the enqueued message is not prohibited from delivery based on comparing transaction information associated with the enqueued message with a whitelist, and wherein the whitelist is used to indicate the transaction processor can handle the enqueued message.

8. The computer system of claim 7, wherein the transaction information includes at least one of a transaction type, and a user.

9. The computer system of claim 7, wherein the whitelist comprises at least one of a list of allowed transaction types, and a list of allowed users.

10. The computer system of claim 9, further comprising:
    updating the whitelist based on a reply message with a transaction status update.

11. A computer program product for message delivery to a transaction processor, comprising:
    one or more computer-readable storage medium and program instructions stored on at least one of the one or more tangible storage medium, the program instructions executable by a processor, the program instructions comprising:
    program instructions to detect an enqueued message in the request queue;
    in response to detecting the enqueued message in the request queue, program instructions to determine if an expire time associated with the detected message exceeds an estimated delivery time;
    in response to determining that the expire time associated with the detected message does not exceed the estimated delivery time, program instructions to discard the detected message from the request queue;
    in response to determining that the expire time associated with the detected message exceeds the estimated delivery time, program instructions to wait until a transaction allowed event occurs;
    in response to the transaction allowed event occurring, program instructions to determine if the detected message has not expired; and in response to determining that the detected message has not expired, program instructions to send the detected message to the transaction processor.

12. The computer program product of claim 11, further comprising:

program instructions to determine that the enqueued message is not prohibited from delivery based on comparing transaction information associated with the enqueued message with a whitelist, and wherein the whitelist is used to indicate the transaction processor can handle the enqueued message.

13. The computer program product of claim 12, wherein the transaction information includes at least one of a transaction type, and a user.

14. The computer program product of claim 12, wherein the whitelist comprises at least one of a list of allowed transaction types, and a list of allowed users.

15. The computer program product of claim 14, further comprising:

program instructions to update the whitelist based on a reply message with a transaction status update.

* * * * *